United States Patent
Ono et al.

(10) Patent No.: US 9,502,724 B2
(45) Date of Patent: Nov. 22, 2016

(54) FUEL CELL SYSTEM AND OPERATION METHOD THEREOF

(75) Inventors: Takashi Ono, Kirishima (JP); Takashi Shigehisa, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 756 days.

(21) Appl. No.: 13/996,272

(22) PCT Filed: Dec. 21, 2011

(86) PCT No.: PCT/JP2011/079749
§ 371 (c)(1),
(2), (4) Date: Jun. 20, 2013

(87) PCT Pub. No.: WO2012/086736
PCT Pub. Date: Jun. 28, 2012

(65) Prior Publication Data
US 2013/0295480 A1    Nov. 7, 2013

(30) Foreign Application Priority Data

Dec. 21, 2010 (JP) .................................. 2010-284734

(51) Int. Cl.
*H01M 8/04* (2016.01)
*H01M 8/12* (2016.01)
*H01M 8/06* (2016.01)

(52) U.S. Cl.
CPC ..... *H01M 8/04223* (2013.01); *H01M 8/04664* (2013.01); *H01M 8/04753* (2013.01);
(Continued)

(58) Field of Classification Search
CPC .................... H01M 8/04223; H01M 8/04225; H01M 8/04231; H01M 8/04302; H01M 8/04447; H01M 8/04798
See application file for complete search history.

(56) References Cited

U.S. PATENT DOCUMENTS

| 5,290,641 | A | 3/1994 | Harashima |
| 7,291,418 | B2 * | 11/2007 | Champion ........ H01M 8/04022 429/429 |

(Continued)

FOREIGN PATENT DOCUMENTS

| EP | 2416420 A1 | 2/2012 |
| JP | 3122971 A | 5/1991 |

(Continued)

OTHER PUBLICATIONS

European Office Action, European Patent Appln. No. 11850619.5, Jun. 30, 2014, 6 pp.

(Continued)

*Primary Examiner* — Patrick Ryan
*Assistant Examiner* — Julian Anthony
(74) *Attorney, Agent, or Firm* — Volpe and Koenig, P.C.

(57) ABSTRACT

A fuel cell system may be capable of reducing an adverse influence which acts on a fuel cell at the time of restarting the fuel cell after emergency shutdown of operation of the fuel cell. A fuel cell system includes a fuel cell, a fuel gas supply unit, an oxygen-containing gas supply unit, a storage unit that stores whether shutdown of operation of the fuel cell is normal shutdown or emergency shutdown, and a control unit that controls at least the fuel gas supply unit and the oxygen-containing gas supply unit. The control unit, in emergency shutdown, controls the fuel gas supply unit at a time of restarting the fuel cell after the shutdown of the fuel cell so as to reduce an amount of fuel gas supplied to the fuel cell to be less than that at a time of restarting the fuel cell after normal shutdown.

7 Claims, 7 Drawing Sheets

(52) U.S. Cl.
CPC ..... *H01M8/04776* (2013.01); *H01M 8/04955* (2013.01); *H01M 8/0618* (2013.01); *H01M 2008/1293* (2013.01); *H01M 2250/10* (2013.01); *Y02B 90/14* (2013.01); *Y02E 60/50* (2013.01); *Y02E 60/525* (2013.01)

(56) References Cited

U.S. PATENT DOCUMENTS

| | | | | |
|---|---|---|---|---|
| 8,288,044 | B2* | 10/2012 | Hayashi | H01M 8/04231 429/429 |
| 8,367,260 | B2* | 2/2013 | Lerner | H01M 8/04223 429/429 |
| 2011/0039173 | A1 | 2/2011 | Kanazu | |
| 2012/0021307 | A1 | 1/2012 | Watanabe et al. | |
| 2013/0196239 | A1 | 8/2013 | Otsuka et al. | |
| 2014/0057191 | A1 | 2/2014 | Kato | |

FOREIGN PATENT DOCUMENTS

| | | |
|---|---|---|
| JP | 2006066244 A | 3/2006 |
| JP | 2006086016 A | 3/2006 |
| JP | 2006344408 A | 12/2006 |
| JP | 2007141787 A | 6/2007 |
| JP | 2009059556 A | 3/2009 |
| JP | 2010153064 A | 7/2010 |
| JP | 2010238625 A | 10/2010 |
| JP | 2012079422 A | 4/2012 |
| WO | 2010001702 A1 | 1/2010 |
| WO | 2010035113 A1 | 4/2010 |
| WO | 2010114041 A1 | 10/2010 |

OTHER PUBLICATIONS

Japanese Office Action with Statement of Relevance of Non-English References, Japanese Patent Appln. No. 2012-549863, Mar. 11, 2014, 5 pp.

International Search Report, PCT/JP2011/079749, Feb. 6, 2012, 2pp.

* cited by examiner

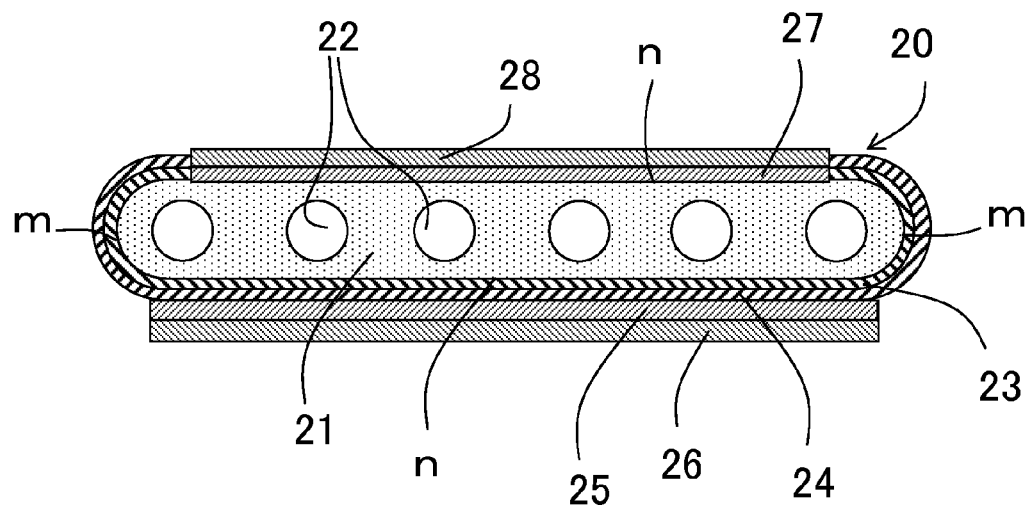
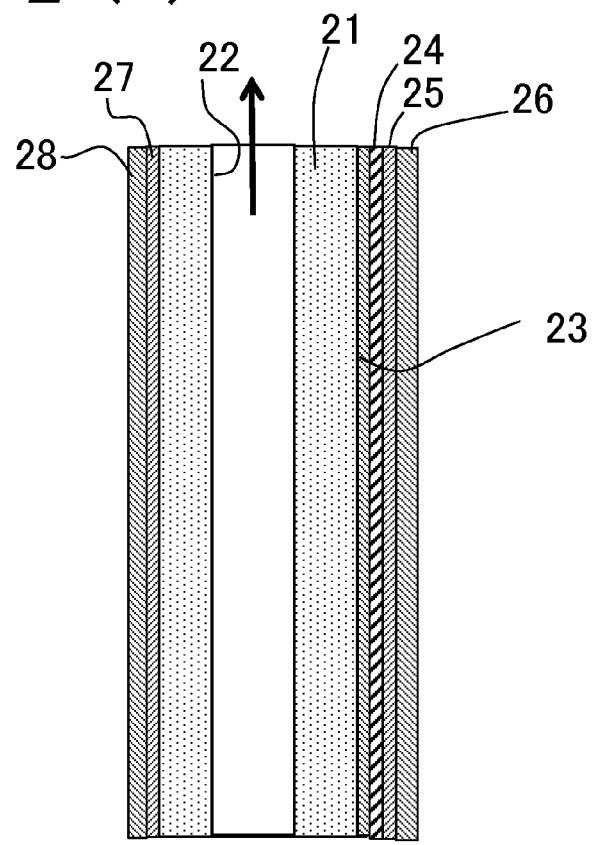

FUEL CELL SYSTEM AND OPERATION METHOD THEREOF

FIELD OF INVENTION

The present invention relates to a fuel cell system and an operating method thereof.

BACKGROUND

Conventionally, a fuel cell system is known which uses a high-temperature operating fuel cell such as a solid oxide fuel cell (SOFC) or a molten carbonate fuel cell (MCFC). A solid oxide fuel cell (SOFC) operates in a high temperature range of about 600° C. to 1000° C. and a molten carbonate fuel cell (MCFC) operates in a high temperature range of about 500° C. to 900° C.

Conventionally, when the supply of fuel gas is stopped due to natural disasters such as an earthquake, a power failure, a lightning strike, or a typhoon, a fuel cell emergently shuts down (for example, see Patent Literature 1).

Conventionally, after the operation of a fuel cell is stopped, maintenance or the like is performed and the operation of the fuel cell is restarted (for example, see Patent Literature 2).

CITATION LIST

Patent Literature

Patent Literature 1: Japanese Unexamined Patent Publication JP-A 2006-66244
Patent Literature 2: Japanese Unexamined Patent Publication JP-A 2006-86016

SUMMARY

Technical Problem

However, the shutdown of operation of the fuel cell includes normal shutdown and emergency shutdown as described above. When a fuel cell emergently shuts down and is then restarted in the same way as in the normal shutdown, the fuel cell may be adversely influenced.

An object of the invention is to provide a fuel cell system and an operating method thereof, capable of reducing an adverse influence which acts on a fuel cell at the time of restarting the fuel cell after emergency shutdown of operation of the fuel cell.

Solution to Problem

A fuel cell system according to the invention includes: a fuel cell that generates electric power using fuel gas and oxygen-containing gas, and combusts fuel gas remaining unused for generation of electric power, on a first end portion side thereof; a fuel gas supply unit that supplies the fuel gas to the fuel cell; an oxygen-containing gas supply unit that supplies the oxygen-containing gas to the fuel cell; a storage unit that, if any shutdown of operation of the fuel cell, stores whether the shutdown of operation of the fuel cell is normal shutdown or emergency shutdown; and a control unit that controls at least the fuel gas supply unit and the oxygen-containing gas supply unit, the control unit, in a case where the shutdown of operation of the fuel cell stored in the storage unit is emergency shutdown, controlling the fuel gas supply unit at a time of restarting the fuel cell after the shutdown of operation of the fuel cell so as to reduce an amount of fuel gas supplied to the fuel cell to be less than an amount of fuel gas supplied to the fuel cell at a time of restarting the fuel cell after normal shutdown of operation of the fuel cell.

A method of operating a fuel cell system according to the invention includes controlling an amount of fuel gas supplied to a fuel cell that generates electric power using fuel gas and oxygen-containing gas and combusts fuel gas remaining unused for generation of electric power, at a time of restarting the fuel cell after emergency shutdown of operation of the fuel cell, to be less than an amount of fuel gas supplied to the fuel cell at a time of restarting the fuel cell after normal shutdown of operation of the fuel cell.

Advantageous Effects of Invention

In the fuel cell system according to the invention, in the case of restarting a fuel cell after the emergency shutdown of operation of the fuel cell, even though a fuel electrode layer of the fuel cell, a support having the fuel electrode layer disposed therein, and the like are oxidized, the fuel electrode layer, the support, and the like are slowly reduced, and it is possible to suppress rapid generation of a stress in the fuel cell without rapid volume contraction of the fuel electrode layer, the support, and the like. It is thus possible to reduce adverse influence which acts on the fuel cell at the time of restarting the fuel cell after the emergency shutdown of operation of the fuel cell.

BRIEF DESCRIPTION OF THE DRAWINGS

FIG. 2 is a diagram illustrating a solid oxide fuel battery cell, where
FIG. 2(a) is a transverse cross-sectional view and FIG. 2(b) is a longitudinal cross-sectional view;
FIG. 3(a) is a side view schematically illustrating the fuel cell and FIG. 3(b) is a partially-enlarged cross-sectional view illustrating parts surrounded with dotted lines in the fuel cell in FIG. 3(a)

DETAILED DESCRIPTION OF THE PREFERRED EMBODIMENTS

Figure 1:
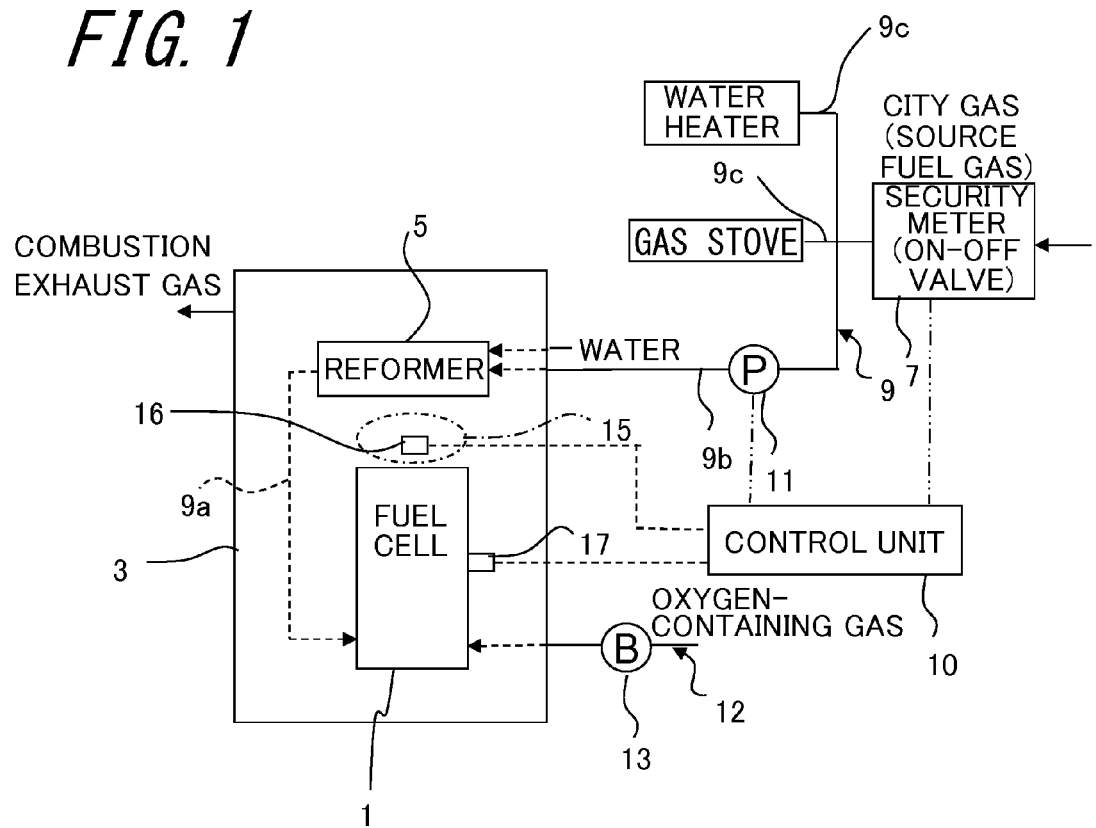
FIG. 1 is a diagram illustrating a fuel cell system.

FIG. 1 shows a fuel cell system according to an embodiment of the invention, where reference numeral 1 represents a solid oxide fuel cell 1 (hereinafter, also referred to as a fuel cell 1). The fuel cell 1 has a plurality of fuel battery cells electrically connected in series to each other.

The fuel cell 1 generates electric power using fuel gas and oxygen-containing gas. The fuel cell 1 is housed in a housing 3. The housing 3 also houses a reformer 5 and is configured to supply the fuel gas, which is reformed by the reformer 5, to the fuel cell 1. A catalyst for reforming raw fuel gas such as city gas is received in the reformer 5. The fuel gas reformed by the reformer 5 contains steam. The fuel cell 1 will be described later.

The reformer 5 is configured to be supplied with raw fuel gas such as city gas, which is reformed into fuel gas, via a security meter 7. A security meter 7 is provided, for example, to each household. The usage of raw fuel gas used in the corresponding household is displayed on the security meter 7, and the security meter includes an on-off valve for stopping the supply of raw fuel gas to the fuel cell system at the time of emergency of natural disasters such as an earthquake, a power failure, a lightning strike, or a typhoon. The security meter 7 is also a gas meter. The security meter 7 is configured to supply the raw fuel gas to, for example, a water heater and a gas stove, in addition to the fuel cell system, and includes a gas-appliance raw fuel line 9c for each gas appliance.

The reformer 5 and the fuel cell 1 are connected to each other with a reformed fuel line 9a supplying the fuel gas. The security meter 7 and the reformer 5 are connected to each other with a raw fuel line 9b supplying the raw fuel gas. The reformed fuel line 9a and the raw fuel line 9b constitute a fuel gas supply line. The reformed fuel line 9a, the raw fuel line 9b, and the gas-appliance raw fuel line 9c are formed of pipes. The security meter 7 having an on-off valve is disposed at an upstream end of the fuel gas supply line 9, that is, at an upstream end of the raw fuel line 9b.

A pump 11 supplying the raw fuel gas to the reformer 5 is disposed downstream in the fuel gas supply line 9, specifically, downstream from the on-off valve of the raw fuel line 9b. The pump 11 and the security meter 7 are connected to a control unit 10. The control unit 10 controls the amount of raw fuel gas supplied to the reformer 5 so as to control the amount of fuel gas supplied to the fuel cell 1 depending on a load, by controlling the pump 11.

The load means electrical appliances such as a refrigerator, a washing machine, or a microwave oven and is supplied with electric power generated by the fuel cell 1.

In FIG. 1, the gas-appliance raw fuel lines 9c are connected to the water heater and the gas stove, respectively. The gas-appliance raw fuel lines 9c are connected to the raw fuel line 9b of the fuel cell system.

A check valve (not shown) which is opened only at a pressure higher than a predetermined pressure is disposed downstream from the pump 11 in the fuel gas supply line 9, and stops the supply of raw fuel gas when the pump 11 shuts down. The fuel gas supply unit includes the pump 11.

The reformer 5 is supplied with water by the use of a pump (not shown) controlled by the control unit 10. The water is changed to steam in the reformer 5 and reacts with the raw fuel gas such as city gas and propane gas to enable steam reforming.

The fuel cell 1 is supplied with oxygen-containing gas such as air via an oxygen-containing gas supply line 12. The supply of oxygen-containing gas to the fuel cell 1 is performed by a blower 13 disposed in the oxygen-containing gas supply line 12. The blower 13 is controlled by the control unit 10. The oxygen-containing gas supply unit includes the blower 13.

An ignitor 16 such as a heater is disposed above the fuel cell 1 and ignites the fuel gas remaining unused for generation of electric power. The ignition timing of the ignitor 16 is controlled by the control unit 10.

In the fuel cell 1, a temperature sensor 17 such as a thermocouple measuring the temperature in the vicinity of the fuel cell 1 is disposed at the center in the longitudinal direction of the fuel battery cells and the center in an arrangement direction of the plurality of fuel battery cells, as described later, and a signal from the temperature sensor 17 is transmitted to the control unit 10. The temperature detecting unit includes the temperature sensor 17.

In a steady state (power generation mode), the fuel gas is supplied from the reformer 5 to the fuel cell 1 and the oxygen-containing gas (hereinafter, air may also be described as the oxygen-containing gas) such as air is supplied to the housing 3, whereby the fuel cell 1 generates electric power. The fuel gas remaining unused for generation of electric power is combusted on the reformer 5 side in the fuel cell 1 by reacting with the oxygen-containing gas, and a combustion area 15 is formed between the fuel cell 1 and the reformer 5. The reformer 5 is heated by the combustion gas and the raw fuel gas in the reformer 5 is reformed into fuel gas containing hydrogen as a major component.

The fuel cell 1 has a plurality of fuel battery cells electrically connected in series to each other and a fuel battery cell is shown in FIG. 2. FIG. 2(a) is a transverse cross-sectional view of a fuel battery cell 20 and FIG. 2(b) is a longitudinal cross-sectional view of the fuel battery cell 20. In both drawings, the fuel battery cell 20 is partly enlarged.

The fuel battery cell 20 is a fuel battery cell 20 having a hollow plate shape and includes a porous conductive support substrate (hereinafter, also referred to as a conductive support) 21 having a flat cross-section and an elliptic cylinder shape as a whole. A plurality of fuel gas flow channels 22 are formed at an appropriate interval so as to penetrate the conductive support 21 in the longitudinal direction y. The fuel battery cell 20 has a structure in which various members are formed on the conductive support 21.

The conductive support 21 includes a pair of flat surfaces n parallel to each other and arc-like surfaces (side surfaces) m connecting the pair of flat surfaces n to each other. Both flat surfaces n are substantially parallel to each other, and a porous fuel electrode layer 23 is formed to cover one flat surface n (lower surface) and both arc-like surfaces m. A dense solid electrolyte layer 24 is stacked thereon to cover the fuel electrode layer 23. A porous oxygen electrode layer 26 is stacked on the solid electrolyte layer 24 so as to face the fuel electrode layer 23 with a reaction preventing layer 25 interposed therebetween. An interconnector 28 is formed on the other flat surface n (upper surface), on which the fuel electrode layer 23 and the solid electrolyte layer 24 are not stacked, with a close adhesive layer 27 interposed therebetween.

The conductive support 21 and the fuel electrode layer 23 contain metal, and Ni, Fe, and Co, and the like are known as examples of the metal. The fuel electrode layer 23 contains metal oxide in addition to metal, and stabilized zirconia or partially-stabilized zirconia is known as examples of the metal oxide.

That is, the fuel electrode layer 23 and the solid electrolyte layer 24 are formed to the other flat surface n (upper surface) via the arc-like surfaces m on both sides of the conductive support 21, both ends of the interconnector 28 are located at both ends of the solid electrolyte layer 24, the conductive support 21 is surrounded with the solid electrolyte layer 24 and the interconnector 28 so as not to leak the fuel gas flowing therein to the outside.

As indicated by an arrow in FIG. 2(b), the fuel gas flows from a lower end to an upper end of the fuel gas flow channel 22 of each fuel battery cell 20, is discharged to the upper side from the fuel battery cell 20, and is combusted above the fuel battery cell 20. Therefore, an upper end portion which is the combustion side of the fuel battery cell 20 is higher in temperature than the lower end portion thereof.

Figure 3:
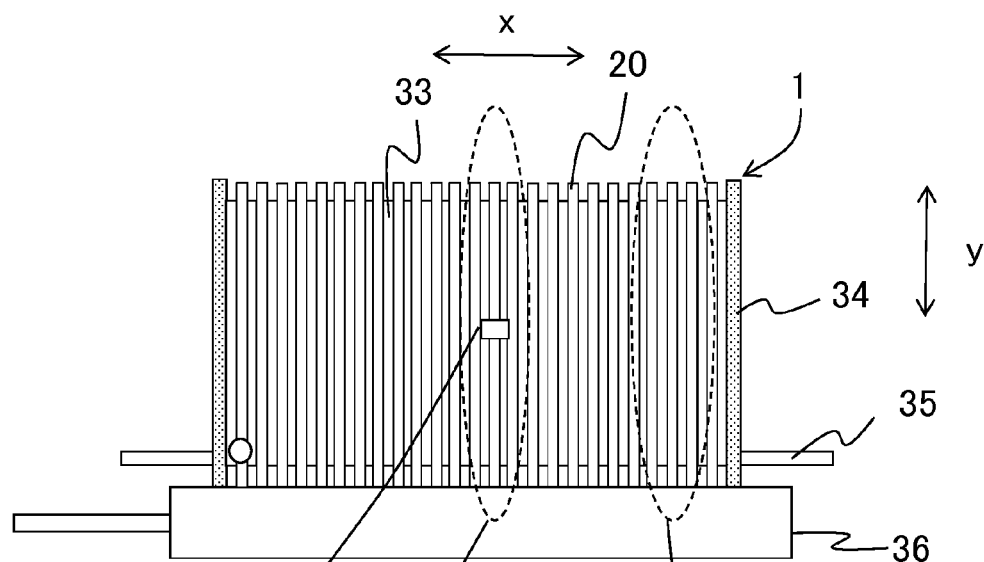
FIG. 3 is a diagram illustrating an example of a fuel cell, where
Figure 3:
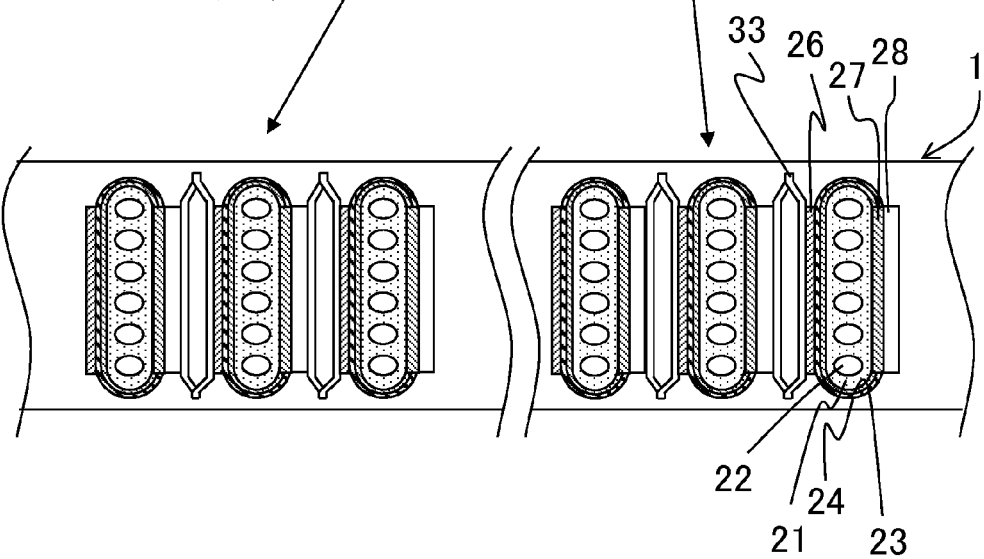

FIG. 3 is a diagram illustrating an example of a fuel cell (also referred to as a cell stack) in which the plurality of fuel battery cells 20 as described above are electrically connected in series with a power collecting member 33 interposed therebetween. FIG. 3(*a*) is a side view schematically illustrating the fuel cell 1, and FIG. 3(*b*) is a partially-enlarged cross-sectional view of the fuel cell 1 in FIG. 3(*a*) and shows the enlargement of the parts surrounded by dotted lines in FIG. 3(*a*). In FIG. 3(*b*), portions corresponding to the parts surrounded by the dotted lines in FIG. 3(*a*) are guided by arrows so as to specify the portions. In the fuel battery cells 20 shown in FIG. 3(*b*), some members such as the reaction preventing layer 25 are not shown.

In the fuel cell 1, the fuel battery cells 20 are arranged in a line with the power collecting member 33 interposed therebetween in the direction (in the thickness direction of the fuel battery cells 20) perpendicular to the longitudinal direction of the fuel battery cells 20 to form the fuel cell 1, and the lower end portion of each fuel battery cell 20 is fixed to a gas tank 36 supplying the fuel gas to the fuel battery cells 20 with an adhesive such as a glass sealant. Elastically deformable conductive members 34 whose lower end portions are fixed to the gas tank 36 are provided so as to pinch the plurality of fuel battery cells 20 from both ends in the arrangement direction x of the fuel battery cells 20. Here, the fuel cell 1 has a structure in which a plurality of fuel battery cells 20 are fixed to the gas tank 36.

In the conductive member 34 shown in FIG. 3, a current drawing portion 35 for drawing out current generated by the power generation of the fuel cell 1 is disposed in a shape extending to the outside along the arrangement direction x of the fuel battery cells 20. The temperature sensor 17 is disposed at the center in the arrangement direction x of the plurality of fuel battery cells 20 and at the center in the longitudinal direction y of each fuel battery cell 20. The temperature sensor 17 is disposed at a position not contacting but as close as possible to the fuel battery cells 20.

Figure 4:
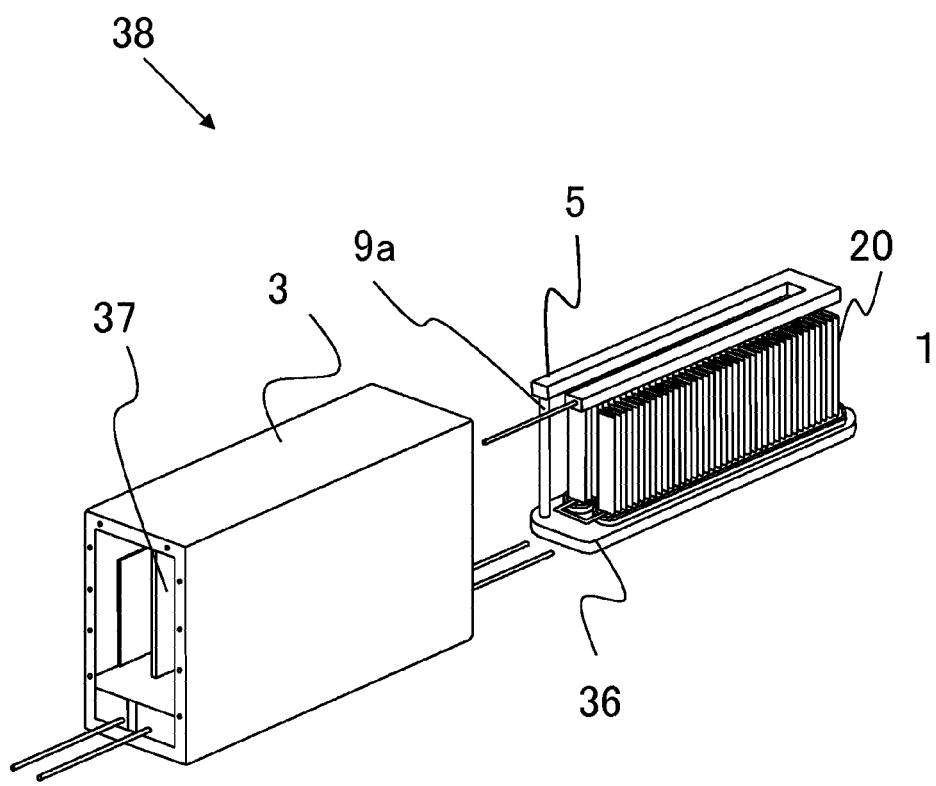
FIG. 4 is an exterior perspective view illustrating an example of a fuel cell module.

FIG. 4 is an exterior perspective view illustrating an example of a fuel cell module 38 in which the fuel cell 1 is housed in the housing 3, where the fuel cell 1 shown in FIG. 3 is housed in the housing 3 having a rectangular parallelepiped shape.

The reformer 5 is disposed above the fuel cell 1 so as to obtain the fuel gas used in the fuel battery cells 20. The fuel gas generated in the reformer 5 is supplied to the gas tank 36 via the fuel gas supply line 9*a* and is supplied to the fuel gas flow channels 22 disposed in the fuel battery cells 20 via the gas tank 36. In FIG. 4, the fuel cell 1 has a structure in which the fuel battery cells 20 are arranged in two lines and fixed to the gas tank 36.

FIG. 4 shows a state where a part (front and rear surfaces) of the housing 3 is removed and the fuel cell 1 and the reformer 5 housed therein are drawn out to the rear side. In the fuel cell module 38 shown in FIG. 4, the fuel cell 1 can be housed in the housing 3 in a sliding manner.

An oxygen-containing gas introducing member 37 disposed in the housing 3 is disposed between cell groups of two lines installed in parallel to the gas tank 36 in FIG. 4. Oxygen-containing gas is supplied to the lower end portions of the fuel battery cells 20 by the use of the oxygen-containing gas introducing member 37 so that the oxygen-containing gas flows from a lower end to an upper end through sides of the fuel battery cells 20 to correspond to the flow of the fuel gas. The oxygen-containing gas introducing member 37 constitutes a part of the oxygen-containing gas supply line 12.

By causing the fuel gas discharged from the fuel gas flow channels 22 of the fuel battery cells 20 to react with the oxygen-containing gas so as to combust the fuel gas above the fuel battery cells 20, it is possible to raise the temperature of the fuel battery cells 20 and thus to promote the startup of the fuel cell 1. By causing the fuel gas discharged from the gas flow channels 22 of the fuel battery cells 20 to react with the oxygen-containing gas above the fuel battery cells 20 so as to combust the fuel gas, the reformer 5 disposed above the fuel battery cells 20 (the fuel cell 1) can be heated. Accordingly, it is possible to efficiently perform the reforming reaction in the reformer 5. The reformer 5 is rapidly heated by the combustion of the fuel gas at the time of startup, but the temperature rise of the lower end portions of the fuel battery cells 20 into which the fuel gas is introduced is slow.

That is, the fuel gas introduction side (second end portion) in the longitudinal direction y of the fuel cell 1 is lower in temperature than the fuel gas combustion side (first end portion). Particularly, the temperature difference increases at the time of startup.

Figure 5:
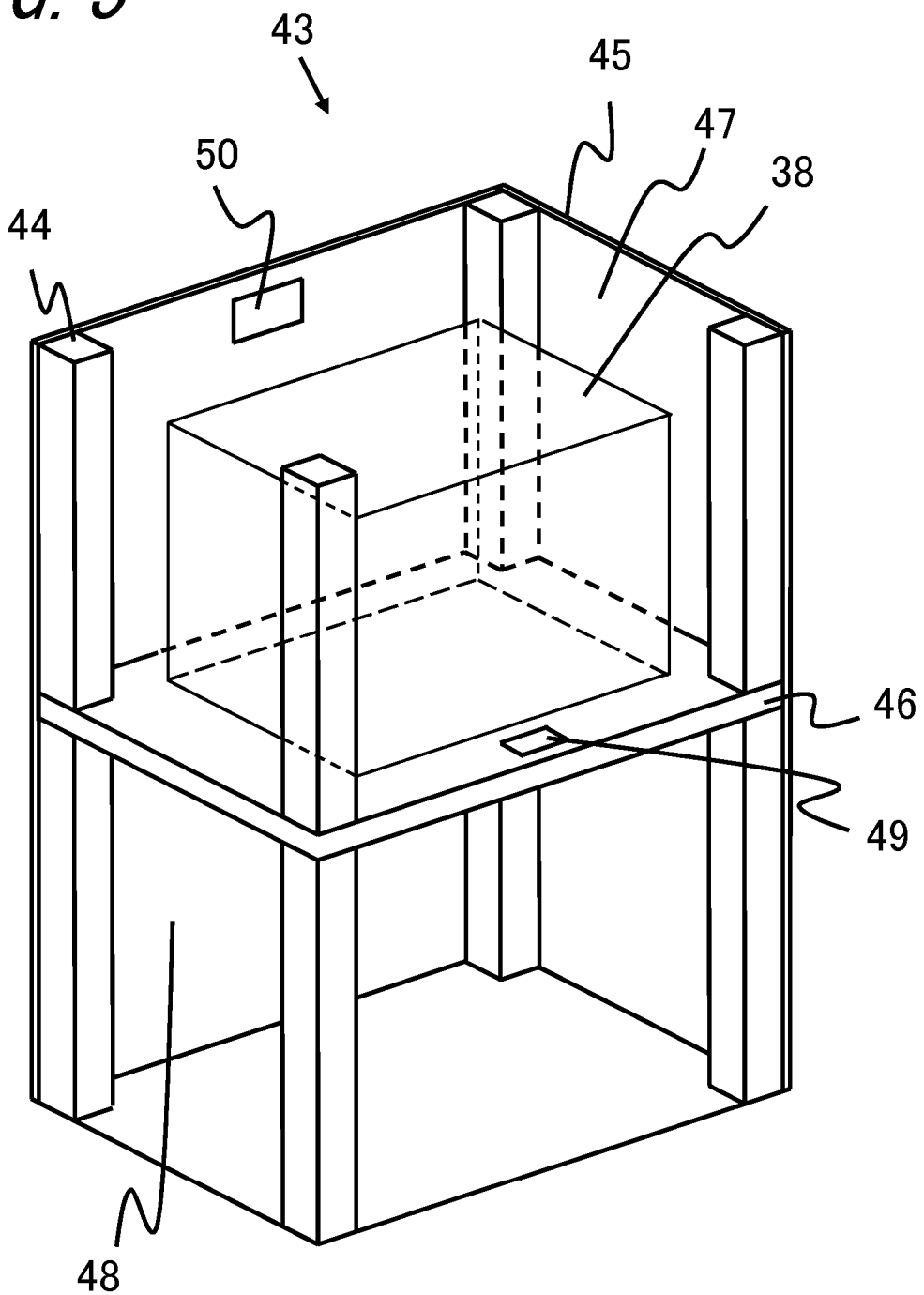
FIG. 5 is an exploded perspective view illustrating an example of a fuel cell device.

FIG. 5 is an exploded perspective view illustrating an example of a fuel cell device in which the fuel cell module 38 shown in FIG. 4 and auxiliary units for operating the fuel cell 1 are housed in an exterior case. Some elements are not shown in FIG. 5.

The fuel cell device 43 shown in FIG. 5 includes an exterior case having columns 44 and exterior plates 45, and the exterior case is vertically partitioned by a partition plate 46. An upper side space of the exterior plates 45 is defined as a module receiving chamber 47 receiving the fuel cell module 38 and a lower side space is defined as an auxiliary unit receiving chamber 48 receiving auxiliary units used to operate the fuel cell module 38. The auxiliary units received in the auxiliary unit receiving chamber 48 are not shown. The pump 11 is received in the auxiliary unit receiving chamber 48.

An air flow port 49 allowing air of the auxiliary unit receiving chamber 48 to flow into the module receiving chamber 47 is formed in the partition plate 46, and an exhaust port 50 exhausting air in the module receiving chamber 47 is formed in a part of the exterior plate 45 constituting the module receiving chamber 47.

The fuel cell system according to this embodiment includes a storage unit that, if any shutdown of operation of the fuel cell should occur, stores whether the shutdown of operation of the fuel cell 1 is normal shutdown or emergency shutdown, and a control unit 10 that, in a case where the shutdown of operation of the fuel cell stored in the storage unit is emergency shutdown, controls the fuel gas supply unit so as to reduce an amount of fuel gas supplied to the fuel cell 1 at a time of restarting the fuel cell after the shutdown of operation of the fuel cell to be less than an amount of fuel gas supplied to the fuel cell at a time of restarting the fuel cell after the normal shutdown of operation of the fuel cell 1.

The first end portion on the combustion side of the fuel cell 1 means the upper end portion of the fuel cell 1 in FIG. 3(*a*) and the second end portion on the opposite side of the first end portion means the lower end portion of the fuel cell 1.

The storage unit that, if any shutdown of operation of the fuel cell should occur, stores whether the shutdown of operation of the fuel cell 1 is the normal shutdown or the emergency shutdown may be disposed independently of the control unit 10. Alternatively, the control unit 10 may have the same function as the storage unit.

The normal shutdown for stopping the operation (power generation) of the fuel cell 1 is performed, for example, by pressing a stop button. For example, after the supply of the oxygen-containing gas is stopped, the fuel gas is supplied for a predetermined time or the housing 3 is filled with inert gas or the like instead of the oxygen-containing gas, so as not to oxidize the fuel electrode layer 23 of the fuel cell 1. When the fuel cell 1 is restarted after the normal shutdown, the restart is performed, for example, by pressing a restart switch, and the fuel gas supplied to the fuel cell 1 is combusted to rapidly heat the fuel cell 1 to a temperature at which electric power can be generated.

On the other hand, in the emergency shutdown, for example, when the on-off valve of the security meter 7 is closed and the supply of raw fuel gas to the reformer 5 is stopped due to natural disasters such as an earthquake, a power failure, a lightning strike, or a typhoon, malfunctions of the system, and the like, the control unit 10 stops the supply of power to a load and stops the operation of the pump 11 disposed in the fuel gas supply line 9 at the time point of transmitting a signal representing that the on-off valve is closed to the control unit 10. The control unit 10 controls a water supply unit and an oxygen-containing gas supply unit to stop the supply of water to the reformer 5 and the supply of oxygen-containing gas to the fuel cell 1. Similarly, when the supply of oxygen-containing gas and the supply of water to the reformer are stopped, the fuel cell system emergently shuts down similarly.

For example, in the normal operation in which the electric power generated by the fuel cell 1 is supplied to an electric appliance, the control unit 10 controls the pump 11, the blower 13, and the like so as to supply the fuel gas at a flow rate of 2.3 L/min, the air at a flow rate of 50 L/min, and the water at an S/C of 2.5. In the emergency shutdown, the supplies of the fuel gas, the air, and the water are immediately stopped.

However, in the high-temperature operating fuel cell 1, when the shutdown of operation of the fuel cell 1 is the emergency shutdown, the supplies of the fuel gas, the air, and the water are immediately stopped and thus the supply of fuel gas to the fuel electrode layer 23 of the fuel cell 1 is rapidly stopped. In this state, since the fuel cell 1 is cooled, an inside of the housing 3 is under a negative pressure, and thus external air may be introduced via a combustion gas discharge port or the like and may be introduced into the fuel cell 1. Accordingly, the fuel electrode layer 23 of the fuel cell 1, the support 21, etc. may be oxidized. In this state, the temperature of the fuel cell 1 is lowered to a room temperature and the operation of the fuel cell 1 is stopped.

At the time of restarting the operation of the fuel cell 1, the fuel gas is supplied to the fuel electrode layer 23 of the fuel cell 1 and the fuel gas remaining unused for generation of the electric power is combusted to rapidly heat the fuel cell 1, in the state where the temperature of the fuel cell 1 is lowered to the room temperature. Accordingly, the reduction of the oxidized fuel electrode layer 23 of the fuel cell 1 rapidly proceeds and a large stress can be easily applied to the fuel cell 1.

Therefore, in this embodiment, the control unit 10, in a case where the shutdown of operation of the fuel cell 1 stored in the storage unit is the emergency shutdown, controls the fuel gas supply unit at the time of restarting the fuel cell after the shutdown of operation of the fuel cell so as to reduce an amount of fuel gas supplied to the fuel cell 1 to be less than that at the time of restarting the fuel cell after the normal shutdown of operation of the fuel cell 1.

In this embodiment, in the entire restarting step after the emergency shutdown of operation of the fuel cell 1, the amount of fuel gas supplied may be set to be lower than that at the time of restarting the fuel cell after the normal shutdown of operation of the fuel cell 1. In this case, even when the fuel electrode layer 23 of the fuel cell 1, the conductive support 21 having the fuel electrode layer 23 disposed thereon, or the like has been oxidized, the fuel electrode layer 23, the conductive support 23, or the like is slowly reduced and thus does not undergo rapid volume contraction. Accordingly, it is possible to suppress rapid application of a stress to the fuel cell 1 and to reduce the adverse influence which acts on the fuel cell 1 at the time of restarting fuel cell after the emergency shutdown of operation of the fuel cell 1. As described below, at least some steps of the restarting step may be performed in a fuel gas supply decreasing mode.

On the other hand, since the fuel gas is combusted at the time of restarting the fuel cell 1, the temperature of the second end portion (lower end portion) on the opposite side of the first end portion (upper end portion) on the combustion side of the fuel cell 1 is lower than that of the first end portion (upper end portion) on the combustion side of the fuel cell 1. Particularly, when the temperature of the lower end portion of the fuel cell 1 is less than the temperature to change water in the fuel gas into steam and the fuel gas is supplied to the lower end portion of the fuel cell 1 at the lower temperature, the steam in the fuel gas is liquefied to water and the S/C of the fuel gas supplied to the end portion (upper end portion) on the combustion side of the fuel cell 1 is lower than the designed value, carbon may be deposited on the fuel electrode layer 23 or the conductive support 21 having the fuel electrode layer 23 disposed thereon.

In other words, when the temperature of the lower end portion of the fuel cell 1 is equal to or higher than the temperature to change water into steam, for example, a high temperature equal to or higher than 100° C., the steam in the fuel gas is supplied to the fuel electrode layer 23 at the fuel cell end portion on the combustion side and the designed S/C is achieved. However, when the temperature of the lower end portion of the fuel cell 1 is lower than the temperature to change water into steam, the steam in the fuel gas is liquefied, the S/C in the fuel gas supplied to the upper end portion on the combustion side of the fuel cell 1 is lowered, carbon is deposited on the fuel electrode layer 23 or the conductive support 21 having the fuel electrode layer 23 disposed thereon, and thus the fuel cell 1 may be adversely influenced. The temperature to change water into steam is in a range of 95° C. to 105° C.

Therefore, in this embodiment, when the temperature during restarting of the fuel cell 1 which is detected by the temperature sensor 17 reaches a predetermined temperature, the control unit 10 controls the fuel gas supply unit so as to reduce the amount of fuel gas supplied to the fuel cell 1 to be less than that at a temperature lower than the predetermined temperature. For example, when the temperature sensor 17 is equal to or higher than the temperature to change water into steam, the fuel gas supply unit is controlled so as to reduce the amount of fuel gas supplied.

Figure 6:
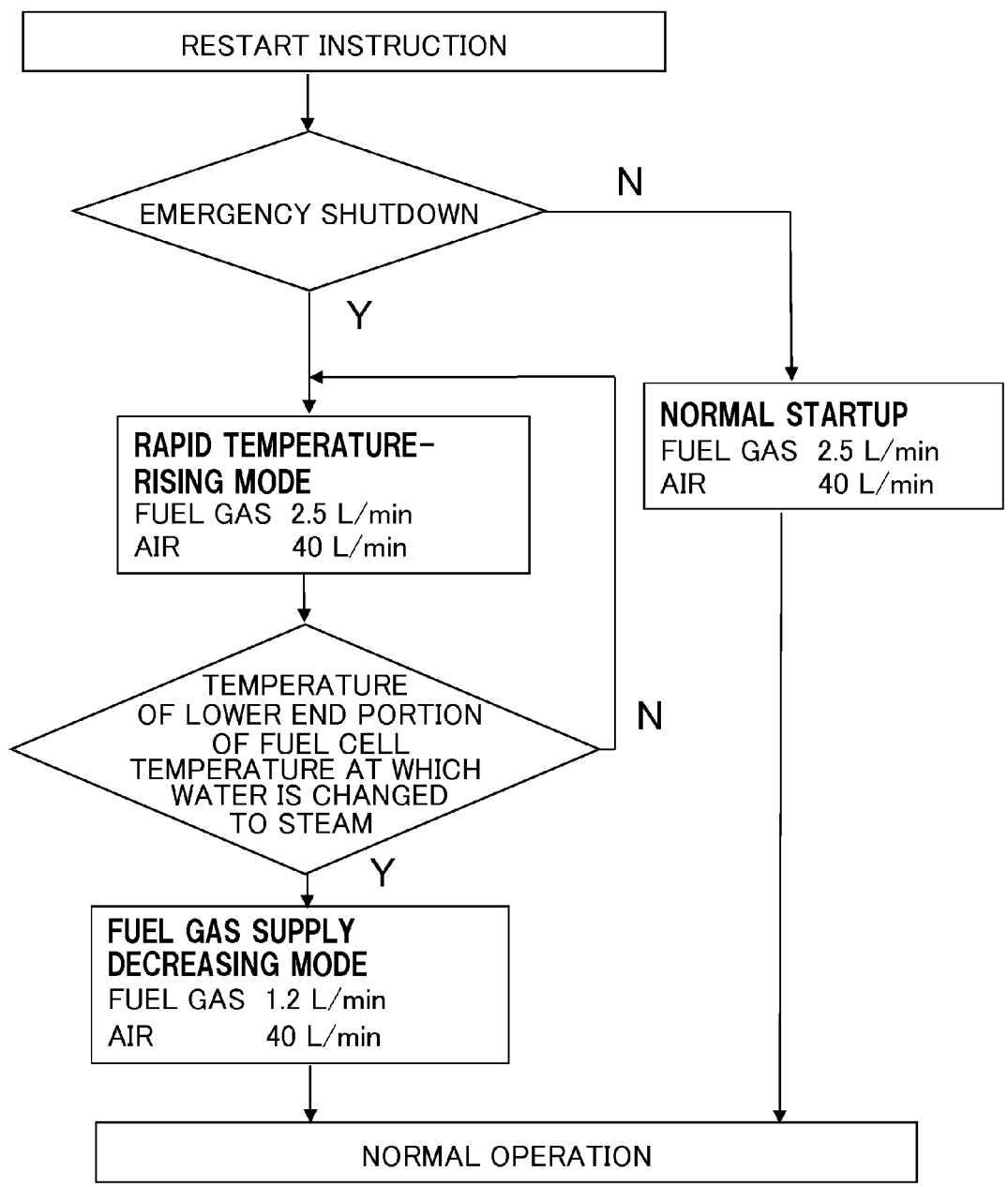
FIG. 6 is a flowchart illustrating a flow of a restarting operation after emergency shutdown.

That is, as shown in FIG. 6, when the shutdown of operation of the fuel cell 1 is the emergency shutdown, the control unit 10 heats the fuel cell 1 at a high rate in a rapid temperature-rising mode, for example, until the lower end portion of the fuel cell 1 reaches the temperature to change water in the fuel gas into steam. After the lower end portion of the fuel cell 1 reaches the temperature to change water in the fuel gas into steam, the control unit 10 sets the fuel gas supply decreasing mode so as to reduce the amount of fuel gas supplied to the fuel cell 1 to be less than before, to lower the temperature-rising rate of the fuel cell 1 by the combustion of the fuel gas remaining unused for generation of electric power, and to slowly heat the fuel cell 1.

In other words, until the lower end portion of the fuel cell 1 reaches the temperature to change water in the fuel gas into steam after the startup, the supply of fuel gas is increased to increase the amount of fuel gas combusted above the fuel battery cells 20 and to rapidly raise the temperature of the fuel cell 1. After the lower end portion of the fuel cell 1 reaches the temperature to change water in the fuel gas into steam, the supply of fuel gas is decreased to reduce the amount of fuel gas combusted above the fuel battery cells 20 and to slowly raise the temperature of the fuel cell 1. The amount of fuel gas supplied is controlled on the basis of the temperature of the lower end portion of the fuel cell 1, but substantially the same effects can be achieved even on the basis of the temperature in the vicinity of the fuel cell 1.

When the fuel cell 1 has a configuration in which a plurality of strip-like fuel battery cells 20 are arranged in line in a direction perpendicular to the longitudinal direction of the fuel battery cells 20 and each fuel battery cell 20 has the fuel gas flow channels 22 for supplying fuel gas in the longitudinal direction of the fuel battery cell 20, a temperature difference can be generated in the longitudinal direction of the fuel battery cells 20 and thus the invention can be suitably applied thereto.

FIG. 7(a) shows the relationship between the temperature T of the lower end portion of the fuel cell 1 and the startup time t and FIG. 7(b) shows the relationship between the amount of fuel gas L supplied to the fuel cell 1 and the startup time t.

Figure 7:
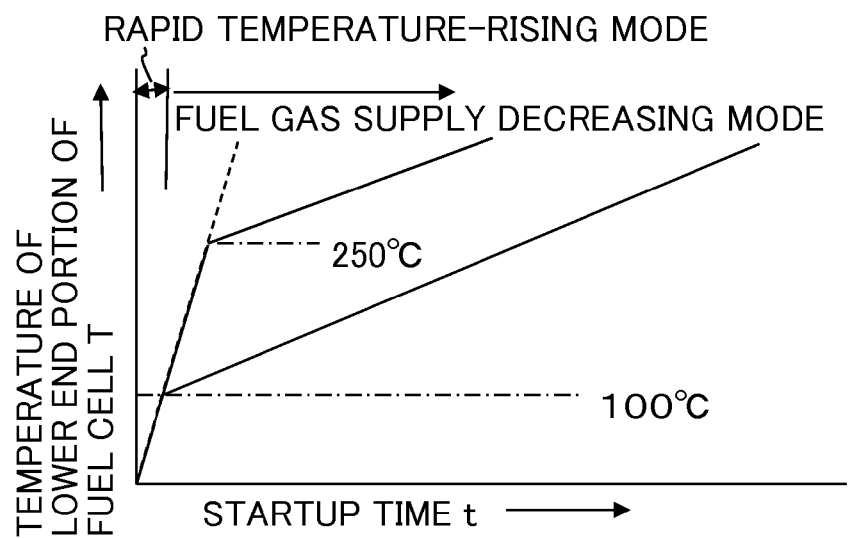
FIG. 7(a) is a graph illustrating a relationship between a temperature T of a lower end portion of the fuel cell and a startup time t thereof and FIG. 7(b) is a graph illustrating a relationship between an amount of fuel gas L supplied to the fuel cell and the startup time t thereof.
Figure 7:
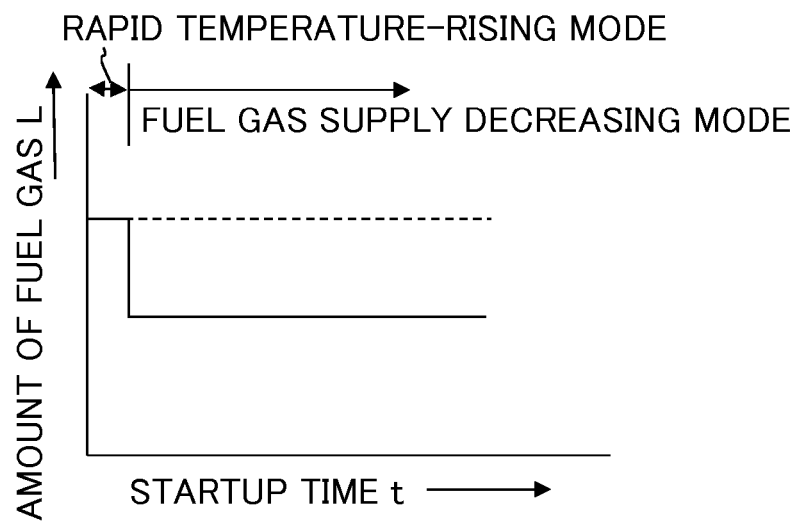

The restart in this embodiment will be described in detail on the basis of FIGS. 6 and 7. First, for example, by pressing a restart switch, a restart instruction is transmitted to the control unit 10, and the control unit 10 determines whether the shutdown of operation of the fuel cell 1 just before the restart is the normal shutdown or the emergency shutdown, using the storage unit. In the case of the normal shutdown, a normal startup operation is performed. That is, the control unit 10 controls the pump 11, the blower 13, and the like so as to supply the fuel gas at a flow rate of 2.5 L/min, the air at a flow rate of 40 L/min, and the water at an S/C of 2.5. In the case of the normal shutdown, since the fuel cell shuts down so as not to oxidize the fuel electrode layer of the fuel cell, the rapid restart in the rapid temperature-rising mode does not damage the fuel cell 1. The normal startup is indicated by a broken line in FIG. 7.

On the other hand, in the case of the emergency shutdown, until the lower end portion of the fuel cell 1 reaches the temperature to change water in the fuel gas into steam, for example, 100° C., the control unit 10 controls the pump 11, the blower 13, and the like so as to supply the fuel gas at a flow rate of 2.5 L/min, the air at a flow rate of 40 L/min, and the water at an S/C of 2.5 and operates the fuel cell in the rapid temperature-rising mode. After the lower end portion of the fuel cell 1 reaches the temperature to change water in the fuel gas into steam, the fuel cell is operated in the fuel gas supply decreasing mode. In the fuel gas supply decreasing mode, the fuel gas is preferably equal to or less than 80% of the amount of fuel gas in the rapid temperature-rising mode and more preferably equal to or less than 60%. For example, the control unit 10 controls the pump 11, the blower, and the like so as to supply the fuel gas at a flow rate of 1.2 L/min, the air at a flow rate of 40 L/min, and the water at an S/C of 2.5.

The temperature T of the second end portion on the opposite side of the first end portion on the combustion side of the fuel cell 1, for example, as in FIG. 3(a), the lower end portion of the fuel cell 1, is obtained from the signal of the temperature sensor 17. That is, the temperature sensor 17 is disposed at the center in the arrangement direction x of the plurality of fuel battery cells 20 and at the center in the longitudinal direction y of the fuel battery cells 10. The temperature sensor 17 is disposed in a portion having the highest temperature in the fuel cell 1 and constantly monitors the temperature of the fuel cell 1. The temperature of the lower end portion of the fuel cell 1 is calculated on the basis of the signal from the temperature sensor 17 by acquiring the correlation between the temperature at the center in the longitudinal direction y of the fuel battery cells 10 and the temperature of the lower end portion of the fuel cell 1 at the center in the arrangement direction x of the plurality of fuel battery cells 20 in advance.

The temperature of the fuel cell 1 is low in the lower end portions of the fuel battery cells 10 because they are separated apart from the combustion region 15, and is low in both end portions in the arrangement direction x of the fuel battery cells 10 because heat can be easily dissipated. Accordingly, as indicated by a circle mark in FIG. 3(a), it is preferable that the temperature sensor 17 be disposed at an end in the arrangement direction x of the fuel battery cells 10 and in the lower end portion of the fuel cell 1, the temperature of a portion having the lowest temperature be calculated, and the fuel gas supply decreasing mode be entered on the basis of this temperature.

In this embodiment as mentioned above, when the temperature of the fuel cell 1 is equal to or higher than the temperature to change water in the fuel gas into steam, the temperature of the fuel cell 1 is slowly raised in the fuel gas supply decreasing mode. Accordingly, even when the fuel electrode layer 23 or the conductive support 21 of the fuel cell 1 is oxidized, the fuel electrode layer 23 or the conductive support 21 is slowly reduced and the rapid volume contraction thereof is suppressed. As a result, it is possible to suppress the rapid application of a stress to the fuel cell 1 and to reduce the adverse influence which acts on the fuel cell 1 at the time of restarting the fuel cell after the emergency shutdown of operation of the fuel cell 1.

The temperature of the entire fuel cell 1 can be rapidly raised to not lower than the temperature to change water in the fuel gas into steam, the S/C in the fuel gas supplied to the upper end portion on the combustion side of the fuel cell 1 can be kept high, and the deposition of carbon in the fuel electrode layer 23 or the conductive support 21 having the fuel electrode layer 23 disposed thereon can be prevented or reduced.

The temperature to change water in the fuel gas into steam is about 100° C., but, from the viewpoint of shortening of the startup time, control may be performed to enter the fuel gas supply decreasing mode at a temperature equal to or higher than a reduction temperature of an oxide of a metal constituting the fuel electrode layer 23 of the fuel battery cell 10, which is higher than 100° C. For example, when the metal constituting the fuel electrode layer 23 is Ni, a reduction temperature of NiO to Ni is equal to or higher than about 250° C. Accordingly, the rapid temperature-rising mode is set up to 250° C. and the fuel gas supply decreasing mode is set at a temperature equal to or higher than 250° C. This state is additionally shown in FIG. 7(a).

As a result, it is possible to maintain the S/C in the fuel gas supplied to the upper end portion on the combustion side of the fuel cell 1 as designed and to shorten the restart time because the temperature of the fuel cell 1 is rapidly raised to the reduction temperature of the oxide of the metal constituting the fuel electrode layer 23, for example, NiO. Since the temperature of the fuel cell is slowly raised at a temperature equal to or higher than the reduction temperature of the oxide of the metal constituting the fuel electrode layer 23, it is possible to suppress the rapid volume contraction of the fuel electrode layer 23 and thus to suppress rapid application of a stress to the fuel cell 1.

In the fuel gas supply decreasing mode, it is preferable that the ignitor 16 be operated. Since the supply of fuel gas decreases in the fuel gas supply decreasing mode, the combustion flame of the fuel remaining unused for generation of electric power tends to be extinguished, but it is possible to prevent fire from being extinguished by constantly operating the ignitor 16 in the fuel gas supply decreasing mode.

The invention is not limited to the above-mentioned embodiment, but various modifications and changes are possible without departing from the scope of the invention.

In the above-mentioned embodiment, the fuel cell employing hollow plate-like solid oxide fuel battery cells is exemplified, but a fuel cell employing cylindrical solid oxide fuel battery cells may be used. The invention can be also applied to such a type of plate-like fuel cell in which plural stacked members of a plate-like fuel battery cell in which a fuel electrode layer, a solid electrolyte layer, and an oxygen electrode layer are sequentially stacked, a fuel-side interconnector connected to the fuel electrode layer, and an oxygen-side interconnector connected to the oxygen electrode layer are stacked with a partition plate interposed therebetween, fuel gas and oxygen-containing gas are supplied to the central portions of the fuel electrode layer and the oxygen electrode layer and flow to the outer circumference of the fuel electrode layer and the oxygen electrode layer, and surplus fuel gas and oxygen-containing gas are discharged and combusted from the outer circumference of the fuel battery cells.

REFERENCE SIGNS LIST

1: Fuel cell
7: Security meter
9: Fuel gas supply line
10: Control unit
12: Oxygen-containing gas supply line
15: Combustion area
16: Ignitor
17: Temperature sensor
20: Fuel battery cell
21: Conductive support
22: Fuel gas flow channel
23: Fuel electrode layer
24: Solid electrolyte layer
26: Oxygen electrode layer
28: Interconnector
38: Fuel cell module
43: Fuel cell device

What is claimed is:

1. A method of operating a fuel cell system comprising:
generating electric power by a fuel cell using fuel gas containing steam, and oxygen-containing gas, and combusts fuel gas remaining unused for generation of electric power, on a first end portion side thereof, wherein the fuel cell has a solid electrolyte, and an oxygen electrode layer and a fuel electrode layer containing a metal which are disposed to interpose the solid electrolyte there between,
supplying, by a fuel gas supply unit, the fuel gas to the fuel cell;
supplying, by an oxygen-containing gas supply unit, the oxygen-containing gas to the fuel cell;
storing, by a storage unit, if any shutdown of operation of the fuel cell should occur, whether the shutdown of operation of the fuel cell is normal shutdown or emergency shutdown, wherein normal shutdown is a shutdown for suppressing oxidization of the fuel electrode layer, and wherein emergency shutdown is a shutdown other than the normal shutdown;
controlling, by a control unit, the fuel gas supply unit and the oxygen-containing gas supply unit; and
measuring temperature, by a temperature detecting unit, a temperature in a vicinity of the fuel cell, and
in a case where the shutdown of operation of the fuel cell stored in the storage unit is the emergency shutdown, and when the temperature during restarting of the fuel cell which is detected by the temperature detecting unit reaches a predetermined temperature in a range between a temperature to change water into steam and a reduction temperature of an oxide of the metal constituting the fuel electrode layer, controlling the fuel gas supply unit at a time of restarting the fuel cell after the shutdown of operation of the fuel cell so as to reduce an amount of fuel gas supplied to the fuel cell to be less than an amount of fuel gas supplied to the fuel cell at a time of restarting the fuel cell after the normal shutdown of operation of the fuel cell.

2. The method of operating a fuel cell system according to claim 1, further comprising:
operating an ignitor that is disposed on the first end portion side of the fuel cell and combusting the fuel gas remaining unused for generation of electric power when the temperature during restarting of the fuel cell reaches the predetermined temperature.

3. The method of operating a fuel cell system according to claim 2, further comprising:
arranging a plurality of strip-like fuel battery cells in line in an arrangement direction perpendicular to a longitudinal direction of the fuel battery cells and the plurality of strip-like fuel battery cells are electrically connected to each other.

4. The method of operating a fuel cell system according to claim 1, further comprising:
arranging a plurality of strip-like fuel battery cells in line in an arrangement direction perpendicular to a longitudinal direction of the fuel battery cells and the plurality of strip-like fuel battery cells are electrically connected to each other.

5. The method of operating a fuel cell system according to claim 4, further comprising:
measuring, by a temperature detecting unit, a temperature in a vicinity of the fuel cell, wherein the temperature detecting unit is disposed at a center in the arrangement direction of the fuel battery cells in the fuel cell and at a center in the longitudinal direction of the fuel battery cells.

6. The method of operating a fuel cell system according to claim 4, further comprising:
measuring, by a temperature detecting unit, a temperature in a vicinity of the fuel cell, wherein the temperature detecting unit is disposed at an end in the arrangement direction of the fuel battery cells in the fuel cell and at a second end portion opposite to a first end portion of the fuel cell.

7. The method of operating a fuel cell system according to claim 1, wherein the fuel cell is a solid oxide fuel cell.

* * * * *